United States Patent [19]

Anderson et al.

[11] Patent Number: 4,572,980
[45] Date of Patent: Feb. 25, 1986

[54] STATOR CORE FOR LARGE ELECTRIC GENERATOR WITH DUAL DOVETAIL SLOTS FOR ENGAGING WEDGES

[75] Inventors: James M. Anderson, Cohoes; William R. Schultz, Jr., Schenectady; Thomas E. VanSchaick, Burnt Hills, all of N.Y.; Frank E. Anderson, Jr., Monroe, Conn.

[73] Assignee: General Electric Company, Schenectady, N.Y.

[21] Appl. No.: 656,107

[22] Filed: Sep. 28, 1984

Related U.S. Application Data

[63] Continuation-in-part of Ser. No. 587,428, Mar. 8, 1984, abandoned.

[51] Int. Cl.⁴ ............................................. H02K 3/487
[52] U.S. Cl. ..................................... 310/214; 310/254
[58] Field of Search ............... 310/254, 213, 214, 215, 310/270, 54, 64, 65

[56] References Cited

U.S. PATENT DOCUMENTS 3,780,325 12/1973 Frankenhauser ................... 310/214

FOREIGN PATENT DOCUMENTS

| 461063 | 3/1947 | France | 310/214 |
| 1115075 | 4/1956 | France | 310/215 |
| 142501 | 4/1978 | Japan | 310/214 |
| 1150975 | 5/1969 | United Kingdom | 310/214 |

Primary Examiner—Peter S. Wong
Assistant Examiner—D. L. Rebsch
Attorney, Agent, or Firm—Paul Checkovich; John F. Ahern

[57] ABSTRACT

A stator core for a dynamoelectric machine includes two pairs of dovetail slots disposed at respective predetermined radial positions in each armature slot. All stator slots contain armature bars. A few equally spaced stator slots also contain "P" bars atop or radially inward from armature bars. Wedges are installed in the radially outer dovetail slots of stator slots containing only armature bars. Wedges are installed in radially inner dovetail slots in stator slots containing both armature bars and "P" bars.

2 Claims, 14 Drawing Figures

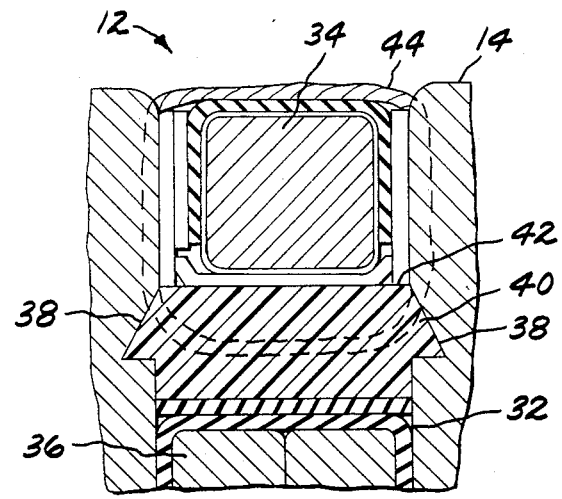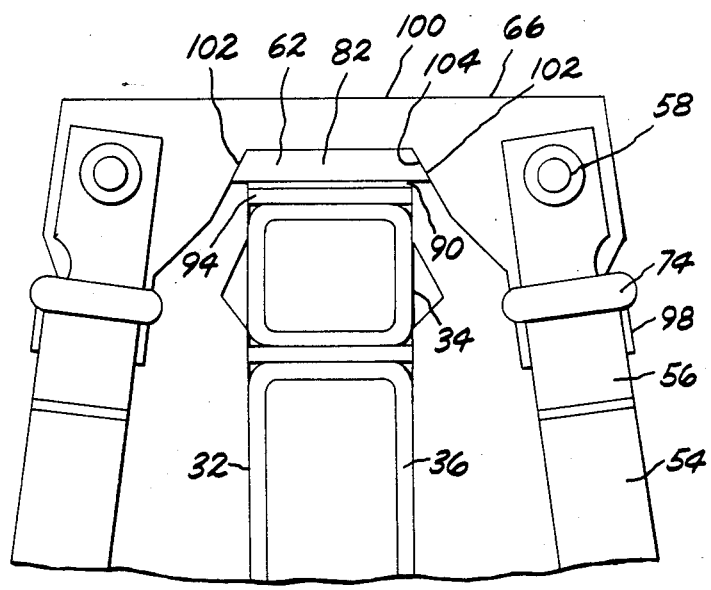

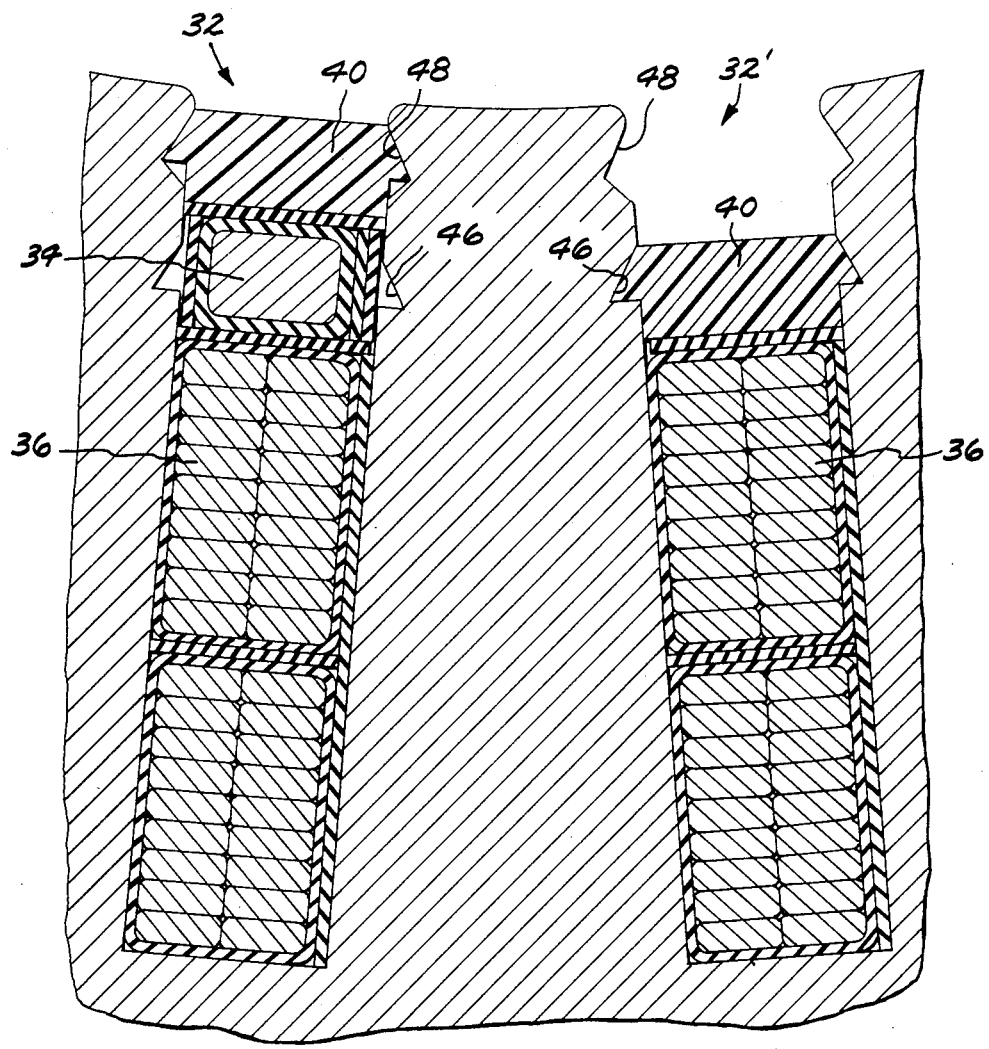

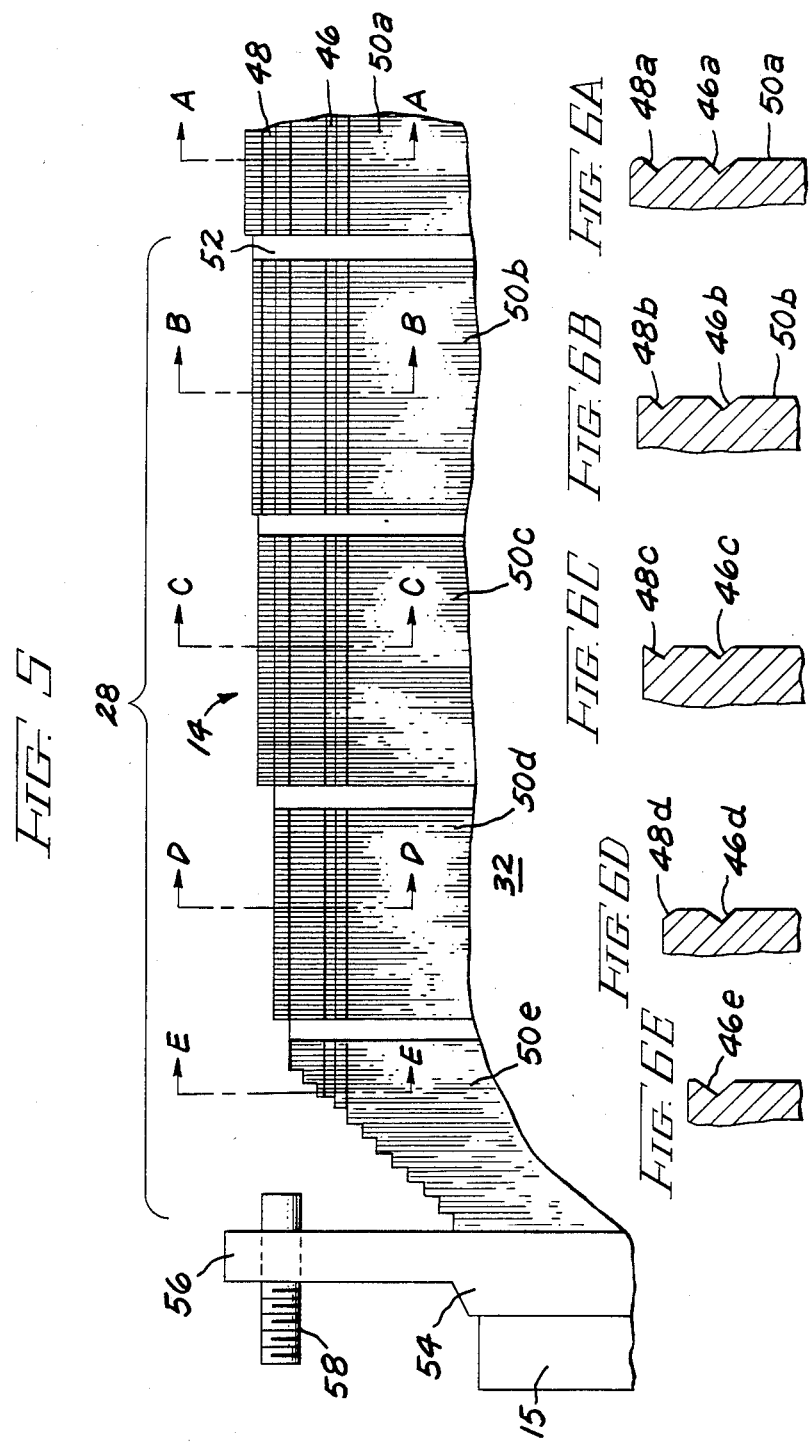

STATOR CORE FOR LARGE ELECTRIC GENERATOR WITH DUAL DOVETAIL SLOTS FOR ENGAGING WEDGES

RELATED APPLICATION

This is a Continuation-In-Part of application Ser. No. 587,428, filed March 8, 1984, now abandoned.

BACKGROUND OF THE INVENTION

The present invention relates to large dynamoelectric machines and, more particularly, to stators of the large electric generators which are commonly the armatures of the generators.

As is well known, large electric generators employ a stator built up by stacking thin laminations of magnetic material to form a generally annular assembly. An array of axial slots are formed in the radially inner surface of the annular assembly. Each axial slot contains at least one and preferably two armature bars which form part of the armature winding in which the electric output is induced.

A rotor is arranged to rotate coaxially within the stator. The rotor conventionally contains field windings which are excited by a DC excitation source of relatively low voltage (from about 300 to about 700 volts) in order to produce a magnetic field rotating at the same speed as the rotor. Prior art excitation sources include shaft-mounted DC generators, shaft-mounted AC alternators feeding rectifiers and external sources of excitation power. The excitation power from external sources is fed to the rotating field windings through slip rings. One popular type of external source makes use of the AC output of the generator itself which, after passing through a transformer to provide the desired excitation voltage, is rectified and fed through slot rings to the field windings.

A more recent excitation system employs potential windings in, for example, three stator slots spaced 120 mechanical degrees apart. The three potential windings, which are hereinafter referred to as "P" bars, are exposed to alternations of the magnetic field which induces an AC voltage therein. The three "P" bars, being spaced 120 degrees apart, therefore comprise a three-phase source whose output can be transformed as necessary to establish a desired excitation voltage which may then be rectified and the resulting DC fed through slip rings to the field windings. A self-excited system of this type is described in a paper by Cotzas et al entitled "GENERREX-PPS (Potential Power Source). Excitation System for Wisconsin Power & Light, Edgewater 5", presented at the Forty-Third Annual American Power Conference, Chicago Ill., April 27–29, 1981. The GENERREX-PPS system provides a compact equipment giving reduced space requirements and simplified maintainability of a large generator. Control of the generator field voltage is accomplished by high-speed thyristor action. Further details of the GENERREX system do not concern the present disclosure and are therefore omitted.

The stator armature bars are conventionally clamped in the stator slots using dovetail grooves near the radially inner ends of the slots into which wedges are firmly engaged. The wedges impose radial forces on the armature bars for resisting radial forces on the armature bars due to normal and abnormal transient magnetic and electrical forces imposed on them.

The "P" bars are conventionally disposed radially inward of the wedges in the air space between the wedges and the surface of the rotor and are tied in place using, for example, a fiber roving pre-impregnated with a heat-curable resin which is cured after the roving is installed. One such method for securing "P" bars in place is disclosed in U.S. Pat. No. 4,385,252.

Securing the "P" bars atop the wedges imposes certain penalties. The need to manually wrap a tie every few inches about the "P" bar and the wedge, and to then cure the resin in the tie, adds substantially to the labor required for assembly of the generator. In addition, after a generator has been in service for a substantial period, the stator may require refurbishing. Since the three "P" bars are atop the wedges, replacement of the wedges in the three slots containing the "P" bars requires cutting the roving ties and removing the "P" bars before removing and replacing the wedges. In order to remove the "P" bars, their coolant piping and end turns must be disconnected. Re-installation of the "P" bars requires again tying them in place, curing the resin and re-connecting the piping and end turns. This equates to increased labor cost and/or adverse impact on scheduling.

In order to reduce heating of the ends of the stator core due to stray axial magnetic fields, it is desirable to outwardly taper the last several inches of the stator core. The outward taper intersects an outer pair of dovetail slots, which are the subject matter of the present disclosure, thus reducing, or eliminating, support of the "P" bars and underlying armature bars in the outer several inches of the stator slots containing the "P" bars. The outward taper may not intersect the inner pair of dovetail slots and thus the armature bars contained in the stator slots not containing "P" bars may not be satisfactorily supported to the axial ends of the stator.

OBJECTS AND SUMMARY OF THE INVENTION

It is an object of the invention to provide a technique for securing armature bars and "P" bars in a generator stator which overcomes the drawbacks of the prior art.

It is a further object of the invention to provide a technique for securing "P" bars in a generator stator below a wedge.

It is a still further object of the invention to provide two pairs of opposed dovetail slots in stator slots of a stator of a dynamoelectric machine, a radially outer pair of dovetail slots being used to retain a wedge securing the armature bars in all stator slots not containing "P" bars and the radially inner pair of dovetail slots being used for securing a "P" bar as well as the armature bars in the stator slots containing "P" bars.

Briefly stated, the present invention provides apparatus for securing conductors in stator slots in a stator core for a dynamoelectric machine. Each stator slot includes two pairs of opposing dovetail slots. All of the stator slots contain armature bars. A few equally spaced stator slots also contain "P" bars atop the armature bars. Wedges are installed in the radially outer dovetail slots of all stator slots containing only armature bars. The wedges are installed in the pairs of dovetail slots at the radially inner pair of dovetail slots in the stator slots containing both the armature bars and the "P" bars.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 3 is a cross sectional view of a stator slot showing the external mounting of a "P" bar according to the prior art.

FIG. 4 is a cross section of an adjacent pair of stator slots taken along IV–IV of FIG. 1 showing mounting of an armature bar both with and without the presence of a "P" bar according to an embodiment of the invention.

FIG. 5 is a view of an end portion of a stator slot illustrating how the tapered portion at the end of the stator intersects and eliminates the outer pair of dovetail slots.

FIGS. 6A–6E, respectively, are cross sections taken along A—A through E—E, respectively, in FIG. 5.

FIG. 10 is an end view of the beam support of FIGS. 7–9.

DETAILED DESCRIPTION OF THE PREFERRED EMBODIMENT

Figure 1:
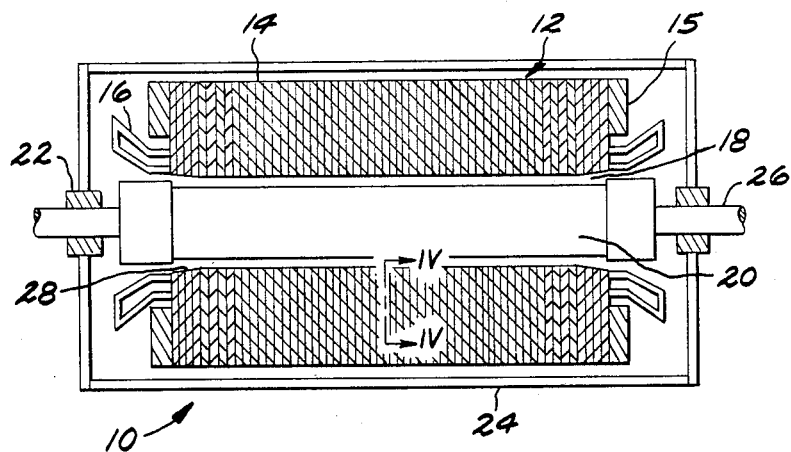
FIG. 1 is a simplified axial cross section of a dynamoelectric generator to which reference will be made in describing the invention.

Referring to FIG. 1, there is shown, generally at 10, a dynamoelectric generator to which the present invention may be applied. Dynamoelectric generator 10 includes a stator 12 which has a stator core 14 built up by stacking a large number of laminations of a magnetic material. The stacked laminations are axially compressed by axial forces applied to the ends thereof through core flanges 15.

A plurality of armature bars (not shown in FIG. 1) are axially disposed in slots (not shown) in the radially inner surface of stator 12. The armature bars are interconnected by end turns 16 extending beyond the axial extremities of stator core 14. Stator 12 forms an annular body having a cylindrical opening 18 on its axis within which a rotor 20 is rotatably mounted using, for example, bearings 22 in a generator frame 24 rotatably supporting shafts 26 of rotor 20.

In order to avoid heating of the ends of stator 12 by stray axial magnetic fields, an outward taper 28 is given to the outer few inches of cylindrical opening 18 at both ends of stator 12.

Figure 2:
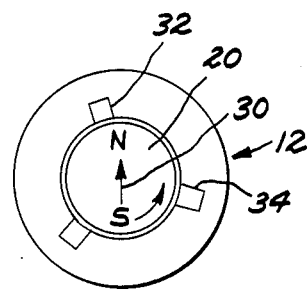
FIG. 2 is an end view of a dynamoelectric generator showing the positioning of "P" bars in the stator thereof.

Referring now to FIG. 2, a simplified transverse cross section of dynamoelectric generator 10 is shown. Rotor 20 is excited by DC excitation applied to it to produce a magnetic field indicated by an arrow 30. A large number of slots are present in the radially inner surface of stator 12, of which only three equally spaced stator slots 32 containing "P" bars 34 are shown. As rotor 20 is rotated in the direction shown, such as by a prime mover (not shown), voltages are induced in the "P" bars by the rotation of the magnetic field of rotor 20. The induced voltages are phased 120 electrical degrees apart corresponding to the physical spacing of "P" bars 34.

It would be clear to one skilled in the art that the above illustration of rotor 20 with a single pair of magnetic poles does not exhaust the possible options. For example, rotor 20 may alternatively be wound to provide two or more sets of angularly spaced magnetic poles. In such a generator, the one-to-one correspondence between electrical degrees and physical degrees is not maintained. The disclosure herein is unaffected by such modification.

Before continuing with the disclosure of the present invention, a brief description of the technique for mounting a "P" bar 34 according to the above referenced U.S. Pat. No. 4,385,252 is included for providing additional background to aid in understanding the present invention.

Referring to FIG. 3, stator slot 32 includes a pair of armature bars 36 (only the upper, or radially inner, one of which is shown). The opposed sides of stator slot 32 include dovetail slots 38 which receive a wedge 40 to rigidly secure armature bars 36 in stator slot 32. It will be noted that stator slot 32 extends radially inward a substantial distance beyond a top surface 42 of wedge 40. This space above or radially inward from top surface 42 of wedge 40 is vacant in all stator slots 32 except for those containing "P" bars 34. "P" bar 34 is appropriately insulated and blocked in place in stator slot 32 and, as fully explained in the referenced patent, is tied in place atop top surface 42 using a plurality of ties 44 which go around the top and sides of "P" bar 34 and under a portion of wedge 40. Ties 44 are preimpregnated with a heat-curable resin which is cured after tying.

Referring now to FIG. 4, there is shown a stator slot 32' according to an embodiment of the present invention which does not contain a "P" bar 34. An inner pair of opposing dovetail slots 46 are disposed in the sidewalls of stator slot 32' in the same radial positions as were occupied by dovetail slots 38 (FIG. 3) of the prior art. An additional outer pair of opposing dovetail slots 48 are disposed radially inward of inner pair of dovetail slots 46 in the sidewalls of stator slot 32'. Wedge 40 is shown installed in inner pair of dovetail slots 46 and securing armature bar 36 in place in stator slot 32. The figure also shows a stator slot 32 containing a "P" bar 34 as well as armature bars 36. "P" bar 34 is disposed atop armature bar 36 beneath wedge 40. In order to provide the necessary additional depth in stator slot 32, wedge 40 is installed in outer pair of dovetail slots 48. This provides secure retention of "P" bar 34 in position without the cost of installing ties and without the need to remove "P" bar 34 if wedge 40 requires replacement.

Referring momentarily to FIG. 1, the embodiment of the invention illustrated in FIG. 4 is satisfactory throughout the axially central portion of stator 12, but a problem develops in the region of outward taper 28. Since outer pair of dovetail slots 48 are closer to the radially inner extremity of stator slot 32 than are inner pair of dovetail slots 46, soon after the innermost axial beginning of outward taper 28, outward taper 28 cuts through outer pair of dovetail slots 48 and eliminates support given to wedge 40. This is illustrated in FIG. 5 and the related cross sections shown in FIGS. 6A–6E.

As is conventional, stator core 14 is assembled in sets of core packages 50 separated by gas passages 52 for the radial passage of coolant gas therethrough. Gas passages 52 conventionally contain a plurality of I-shaped members maintained in compression between the flanges thereof by the compressive forces applied to the stack of laminations in stator core 14. Outward taper 28 is accomplished over a plurality of core packages 50. For example, core package 50a is a full-depth core package whose cross section A—A, shown in FIG. 6A, exhibits a normal amount of supporting material above or radially inwardly from outer pair of dovetail slots 48a. The next core package 50b begins outward taper 28 by being stepped down to a slightly shallower depth. As seen in cross section B—B in FIG. 6B, the amount of material above outer pair of dovetail slots 48b is reduced but may still contain enough material to provide substantial support for a wedge 40. The next core package 50c is stepped down even further to the extent that little or no material is left above outer pair of dovetail slots 48c (FIG. 6C) for supporting wedge 40. The next core package 50d stepped down even further so that no support for wedge 40 is provided. The extreme outer core package 50e is stepped down at its abutment with the adjacent gas passage 52 and continues additional diverging steps until it terminates at a space block 54 clamped against core package 50e by core flanges 15.

Inner pair of dovetail slots 46, being further from the extremity of stator core 14, is relatively unaffected by outward taper 28 in core packages 50a–d. Inner pair of dovetail slots 46e is intersected by outward taper 28 in core package 50e. This intersection occurs close enough to the axially outer extremity of stator core 14 so that external support of end turns (not shown), for an armature bar 36 in a stator slot 32' not containing a "P" bar 34, may be sufficient to overcome the relatively short unsupported run within stator core 14 beyond the intersection of inner pair of dovetail slots 46c by outward taper 28. As previously noted, however, the ability of outer pair of dovetail slots 48 to support wedge 40 is reduced, and then eliminated, a substantial distance from the axially outer end of stator core 14.

A space block extension 56 is included on spaced-apart ones of space blocks 54 for supporting studs 58 which are normally used for attachment of a gas seal (not shown) in dynamoelectric generator 10. Use is made of space block extension 56 and stud 58 in the present invention as will be explained.

Figure 7:
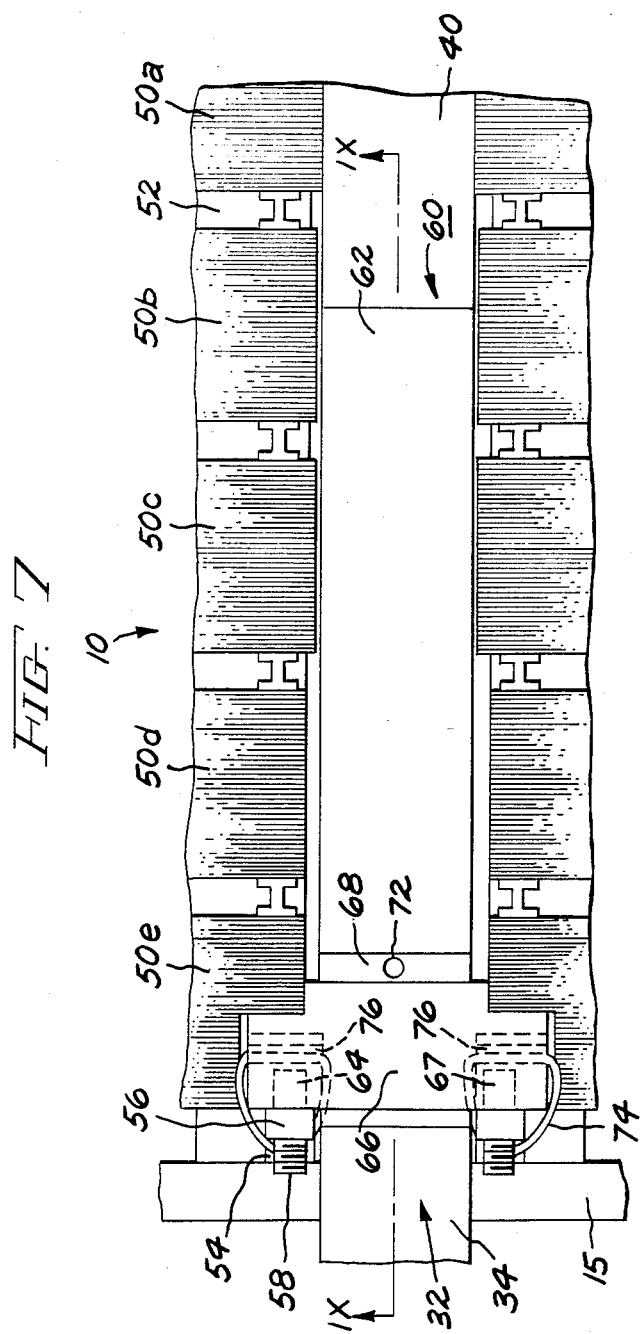
FIG. 7 is a top view of the portion of the stator of FIG. 5 which includes a beam support for supporting the axially outer few inches of "P" bars and armature bars.

Referring now to FIG. 7, a top view of a stator core 14 is shown in which a "P" bar 34 and the underlying armature bars 36 are held in place by a beam support 60. Wedge 40 is terminated at a point in core package 50a, or core package 50b, (a point in core package 50b is illustrated) where adequate supporting material remains in outer pair of dovetail slots 48 (see FIG. 5 and FIG. 6A or 6B). A wedge beam 62, having the same cross-sectional shape as wedge 40, is inserted into outer pair of dovetail slots 48 and into abutment with the end of wedge 40. A space block extension 56 is disposed at each side of stator slot 32 with an inward-extending portion 64 of each stud 58 extending axially inward toward the center of dynamoelectric generator 10. A yoke 66 includes a pair of holes 67 which are fitted onto inward-extending portions 64. Yoke 66 straddles an outer end of wedge beam 62. A trapezoidal locking device 68 is angularly fitted into an angled slot and locked in place by a pin 72. A tie 74 is wrapped about each stud 58 and through a hole 76 in each side of yoke 66 to retain yoke 66 firmly against space block extensions 56. The axially inner end of wedge beam 62 is held down against "P" bar 34 by engagement with outer pair of dovetail slots 48 in core package 50b. The axially outer end of wedge beam 62 is held down against "P" bar 34 by yoke 66. Thus, "P" bar 34 is fully secured in place under wedge beam 62.

Figure 8:
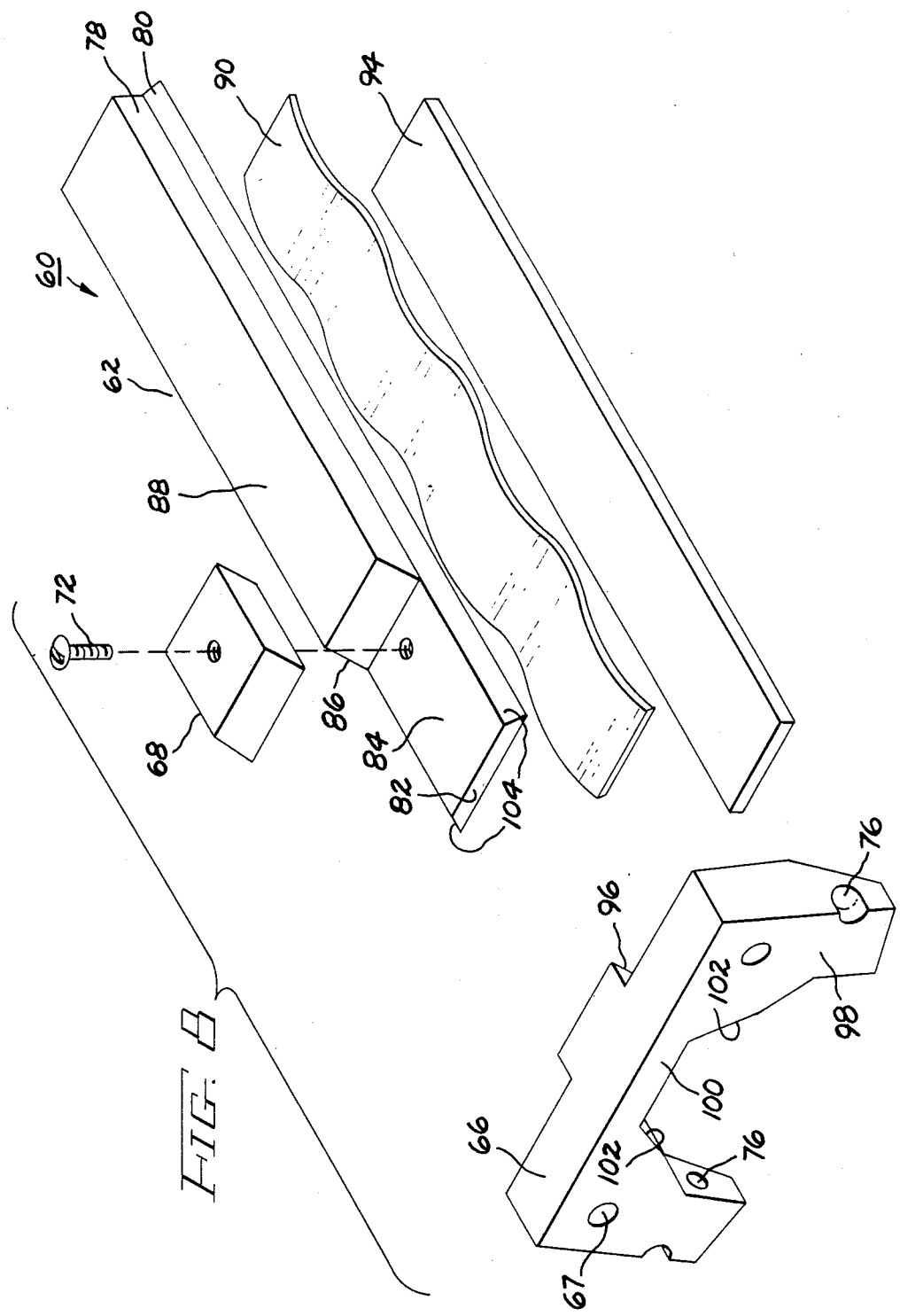
FIG. 8 is an exploded view of the beam support.
Figure 9:
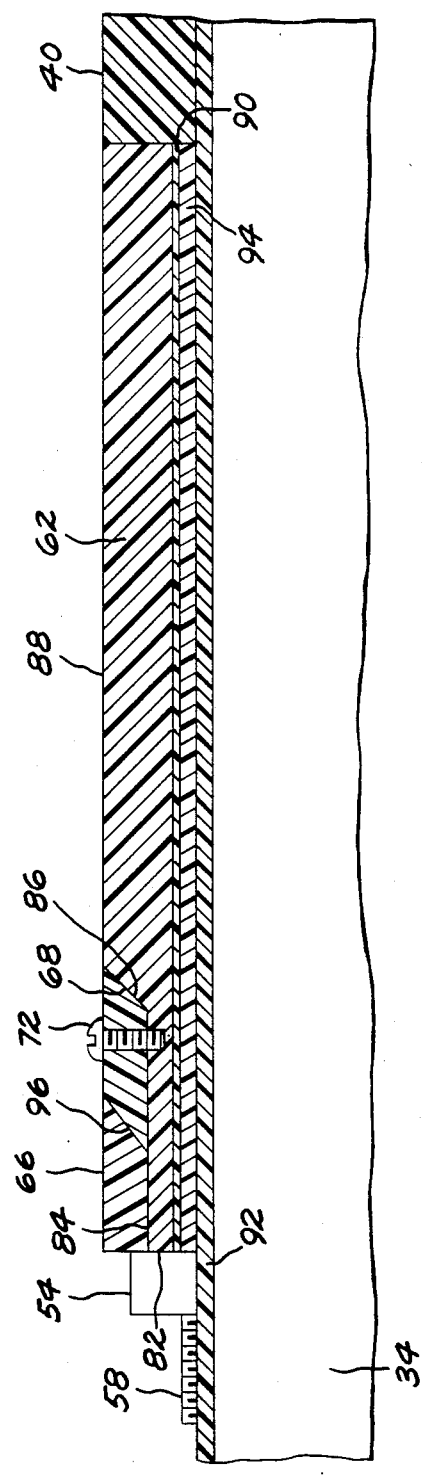
FIG. 9 is a cross section taken along IX—IX of FIG. 7.

Referring now to FIG. 8, in which the elements of beam support 60 are shown in an exploded view for purposes of illustration, and FIG. 9, in which the elements are shown assembled, wedge beam 62 includes an upper portion 78 of generally rectangular cross section and a lower portion 80 which includes the angled flanges for engaging outer pair of dovetail slots 48 at the axially inner end of wedge beam 62. A tongue 82, having a flat upper surface 84, extends axially from wedge beam 62. An angled face 86 joins an upper surface 88 of upper portion 78 to flat upper surface 84. A ripple spring 90 is disposed below wedge beam 62 for providing a substantial radial force tending to secure "P" bar 34 in position. Ripple spring 90 is shown in its relaxed condition in FIG. 8. When installed, ripple spring 90 is preferably completely flattened between wedge beam 62 and "P" bar 34 as shown in FIG. 9.

In order to prevent a high-voltage insulation layer 92 on "P" bar 34 from being damaged by contact with ripple spring 90, a hard, non-abrasive filler strip 94 is positioned between ripple spring 90 and "P" bar 34.

As particularly shown in FIG. 9, an angled face 96 on yoke 66 lies parallel to angled face 86 on wedge beam 62. Trapezoidal locking device 68 is thus enabled to slide between angled face 96 and angled face 86 and, when pinned in place by pin 72, prevents removal of trapezoidal locking device 68.

When stator core 14 is assembled, studs 58 are normally welded, or otherwise premanently installed, in space blocks 54 before beam support 60 is mounted. During installation of beam support 60, wedge beam 62, with ripple spring 90 and non-abrasive filler strip 94 below it, is inserted into outer pair of dovetail slots 48. In order to clear the inner ends of inward-extending portions 64, yoke 66 must be positioned to occupy the space later taken by trapezoidal locking device 68 and then holes 67 are slid onto inward-extending portions 64. Inward-extending portions 64 preferably contain an uncured resin during assembly which is later cured to firmly affix yoke 66 in place against space block 54. After yoke 66 is slid onto inward-extending portions 64, the trapezoidal space left vacant by this assembly technique is filled by trapezoidal locking device 68 which thereupon provides axial support for helping to maintain yoke 66 and wedge beam 62 in their final positions.

Referring now to FIGS. 8 and 10, yoke 66 includes a pair of legs 98 joined by a bridge 100 spanning tongue 82. Legs 98 includes angled surfaces 102 whose angles generally coincide with the angles of edges 104 of flat upper surface 84. Thus, when tongue 82 is held down by bridge 100, angled surfaces 102 and edges 104 tend to maintain the axially outer end of wedge beam 62 properly centered over stator slot 32.

Beam support 60 is preferably made of a non-magnetic material and most preferably of a non-metallic material. With the exception of studs 58 which are stainless steel, all parts of beam support 60 are preferably made of a hard, high-strength matrix of resin and fabric. Wedge beam 62 and yoke 66 are preferably of glass fiber in a cured epoxy resin. Ripple spring 90 is also preferably a glass fiber and epoxy resin chosen from types which retain their resilient properties over time. Ripple spring 90 may alternatively be replaced by corresponding means for applying radial force to "P" bar 34 such as, for example, a body of elastomeric material or a spring having a lunate cross section. Filler strip 94 is chosen for its ability to prevent damage to the high-voltage insulation on the surface of "P" bar 34. For this purpose, a cotton-resin laminate is employed.

The orientation of the fabric in wedge beam 62 is preferably parallel to the axis of wedge beam 62 for best resistance to bending forces. The orientation of the fabric in yoke 66 is preferably normal to the axis of wedge beam 62.

In a further embodiment of the invention, wedge beam 62 and yoke 66, instead of being two separate pieces, may be cast, or otherwise formed, in a single unitary assembly. In a cast version, a chopped fiber is preferably used in order to develop adequate strength in both the axial and the normal directions.

Having described preferred embodiments of the invention with reference to the accompanying drawings, it is to be understood that the invention is not limited to those precise embodiments, and that, various changes and modifications may be effected therein by one skilled in the art without departing from the scope or spirit of the invention as defined in the appended claims.

What is claimed is:

1. A lamination for stacking to form a stator of a dynamoelectric machine comprising:
   a slot-shaped opening in said lamination which, when assembled into said stator, forms a stator slot;
   a first dovetail slot in said opening at a first radius from an axis of said stator;
   a second dovetail slot in said opening at a second radius from said axis of said stator;
   said first radius being effective for receiving a wedge in said first dovetail slot for securing at least one armature bar in said stator slot; and
   said second radius being effective for receiving the wedge in said second dovetail slot for securing a "P" bar and at least one armature bar in said stator slot, whereby either said at least one armature bar alone or said "P" bar and said at least one armature bar may be respectively secured in said stator slot by selection of which dovetail slot receives said wedge.

2. A stator for a dynamoelectric machine comprising:
   an annular stator core of magnetic material;
   a plurality of axially disposed stator slots in an inner surface of said stator core;
   at least one armature bar in each of said stator slots;
   at least one of said stator slots containing a "P" bar atop said at least one armature bar;
   at least a second of said stator slots containing only said at least one armature bar and not containing a "P" bar;
   first and second pairs of opposed dovetail slots respectively disposed in sides of said first and second stator slots respectively;
   said first pair of dovetail slots being at a first radius from an axis of said core, said first radius being effective for positioning a first wedge therein in securing relationship with said at least one armature bar in said second stator slot;
   said second pair of dovetail slots being at a second radius smaller than said first radius, said second radius being effective for positioning a second wedge therein in securing relationship with said "P" bar atop said at least one armature bar in said first stator slot, whereby either armature bars alone or armature bars with a "P" bar atop them may be respectively secured in the stator slot by selective positioning of said first or second wedge in said first or said second pairs of dovetail slots respectively.

* * * * *